(12) United States Patent
Miyazaki

(10) Patent No.: US 10,414,909 B2
(45) Date of Patent: Sep. 17, 2019

(54) RUBBER COMPOSITION

(71) Applicant: SUMITOMO RUBBER INDUSTRIES, LTD., Kobe-shi (JP)

(72) Inventor: Tatsuya Miyazaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 15/761,440

(22) PCT Filed: Sep. 1, 2016

(86) PCT No.: PCT/JP2016/075656
§ 371 (c)(1),
(2) Date: Mar. 20, 2018

(87) PCT Pub. No.: WO2017/064935
PCT Pub. Date: Apr. 20, 2017

(65) Prior Publication Data
US 2019/0048175 A1 Feb. 14, 2019

(30) Foreign Application Priority Data

Oct. 16, 2015 (JP) ................................ 2015-204952

(51) Int. Cl.
| | | |
|---|---|---|
| C08L 21/00 | (2006.01) | |
| C08K 3/22 | (2006.01) | |
| C08K 3/36 | (2006.01) | |
| C08K 5/13 | (2006.01) | |
| C08K 5/20 | (2006.01) | |
| C08K 5/375 | (2006.01) | |
| C08K 5/372 | (2006.01) | |

(52) U.S. Cl.
CPC ............. *C08L 21/00* (2013.01); *C08K 3/22* (2013.01); *C08K 3/36* (2013.01); *C08K 5/13* (2013.01); *C08K 5/20* (2013.01); *C08K 5/372* (2013.01); *C08K 5/375* (2013.01); *C08K 2003/2227* (2013.01); *C08K 2201/019* (2013.01)

(58) Field of Classification Search
CPC ... C08K 3/22; C08K 3/36; C08K 5/13; C08K 5/20; C08K 5/375; C08L 21/00
USPC ........................................................ 524/492
See application file for complete search history.

(56) References Cited

U.S. PATENT DOCUMENTS

| 6,590,017 B1 | 7/2003 | Hergenrother et al. |
|---|---|---|
| 2012/0247630 A1 | 10/2012 | Moreland |
| 2012/0289638 A1 | 11/2012 | Hashimoto et al. |
| 2013/0317151 A1* | 11/2013 | Yagi ........................ B60C 1/00 524/224 |
| 2014/0187693 A1 | 7/2014 | Tsuji |
| 2014/0350174 A1 | 11/2014 | Yukimura et al. |
| 2015/0166580 A1* | 6/2015 | Hirokami .................. C08L 9/06 528/33 |

FOREIGN PATENT DOCUMENTS

| CN | 103403080 A | 11/2013 |
|---|---|---|
| CN | 104710449 A | 6/2015 |
| JP | 4-249551 A | 9/1992 |
| JP | 2003-533574 A | 11/2003 |
| JP | 2009-221248 | * 10/2009 |
| JP | 2011-116815 A | 6/2011 |
| JP | 2012-207019 A | 10/2012 |
| JP | 2012-246334 A | 12/2012 |
| JP | 2013-133402 A | 7/2013 |
| JP | 2013-159653 A | 8/2013 |
| JP | 2013-245265 A | 12/2013 |
| JP | 2014-31390 A | 2/2014 |
| JP | 2014031390 | * 2/2014 |
| JP | 2014-167055 A | 9/2014 |
| WO | 2009/095328 A1 | 8/2009 |
| WO | 2011/086930 A1 | 7/2011 |
| WO | 2012/070626 A1 | 5/2012 |
| WO | WO2012/070625 | * 5/2012 |
| WO | WO 2017/199853 A1 | 11/2017 |

OTHER PUBLICATIONS

International Search Report dated Nov. 29, 2016 in PCT/JP2016/075656 filed Sep. 1, 2016.
Combined Chinese Office Action and Search Report dated Dec. 5, 2018 in Patent Application No. 201680057645.6 (with partial English translation and English translation of categories of cited documents), citing documents AO and AP therein, 10 pages.
Extended European Search Report dated Mar. 21, 2019 in European Patent Application No. 16855189.3, citing documents AA and AO therein, 5 pages.

* cited by examiner

*Primary Examiner* — Deve E Valdez
(74) *Attorney, Agent, or Firm* — Oblon, McClelland, Maier & Neustadt, L.L.P.

(57) ABSTRACT

The purpose of the present invention is to provide a rubber composition in which a rubber viscosity during kneading is low and processability is good though the rubber composition comprises a white filler, and fuel efficiency and abrasion resistance are good. A rubber composition comprising a rubber component, a white filler and a compound represented by the following formula (1),

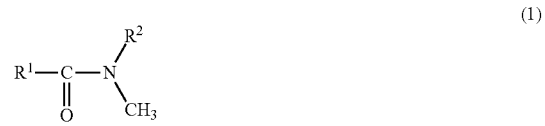

(1)

where $R^1$ represents an alkyl group or alkenyl group having 8 to 14 carbon atoms, the alkyl group or alkenyl group may be linear, branched or cyclic, and $R^2$ represents a hydroxyalkyl group or a hydroxyalkyl group having an oxyalkylene unit.

20 Claims, No Drawings

RUBBER COMPOSITION

TECHNICAL FIELD

The present invention relates to a rubber composition comprising a rubber component, a white filler and a compound represented by a specific formula.

BACKGROUND OF THE INVENTION

Recently for the purpose of saving fuel consumption of cars in compliance with a social demand for energy saving, compounding of a white filler such as silica or aluminum hydroxide is employed in many cases as a filler ensuring compatibility of a low heat build-up characteristic with a grip performance on a wet road surface.

In a white filler such as silica or aluminum hydroxide, there is a tendency that particles thereof are bonded to each other during kneading and are agglomerated, which results in a problem that a compounding viscosity becomes too high and an extrusion processability and a sheet processability of a kneaded product are deteriorated. In order to improve dispersion of silica in a rubber, it is necessary to make a kneading time longer. Further, since a portion of a surface of a silica particle which is not covered with a silane coupling agent is acidic, there is a demerit such that the silica particle adsorbs a basic substance used as a vulcanization accelerator, and therefore, vulcanization of a rubber composition does not proceed sufficiently and a storage elastic modulus is not increased. Therefore, improvement of processability of a rubber composition comprising a white filler has been demanded.

Methods of improving processability and the like of a rubber composition comprising a white filler such as silica has been reported. For example, Patent Document 1 describes a technique such that an amide compound having a polar terminal showing a weak chemical reactivity to silica and a non-polar terminal showing a weak chemical reactivity to an elastic polymer is added to a rubber composition comprising silica as a processing aid for improving dispersion of silica in the rubber composition. Further, in Patent Documents 2 to 5, a technique of adding fatty acid monoethanolamide or fatty acid diethanolamide to a rubber composition comprising a white filler such as silica.

PRIOR ART DOCUMENT

Patent Documents

Patent Document 1: JP 2003-533574 A
Patent Document 2: WO 2012/070626 A1
Patent Document 3: JP 2013-245265 A
Patent Document 4: JP 2014-167055 A
Patent Document 5: JP 2013-159653 A

SUMMARY OF THE INVENTION

Problem to be Solved by the Invention

Conventional fatty acid amide, fatty acid monoethanolamide or fatty acid diethanolamide can inhibit agglomeration of a white filler such silica, but shows a low effect of decreasing a rubber viscosity during kneading and is not sufficient from the viewpoint of improving dispersion of a white filler in a rubber. Further, in these conventional compounds, it is impossible to expect an effect of improving rubber characteristics such as a fuel efficiency (tan δ) and abrasion resistance of a rubber composition.

An object of the present invention is to provide a rubber composition in which a rubber viscosity during kneading is low and processability is good though the rubber composition comprises a white filler, and fuel efficiency and abrasion resistance are good.

Means to Solve the Problem

The present invention relates to a rubber composition comprising a rubber component, a white filler and a compound represented by the following formula (1).

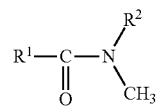

(1)

In the formula (1), $R^1$ represents an alkyl group or alkenyl group having 8 to 14 carbon atoms, the alkyl group and alkenyl group may be linear, branched or cyclic, and $R^2$ represents a hydroxyalkyl group, or a hydroxyalkyl group having an oxyalkylene unit.

It is preferable that the compound represented by the following formula (1) is coconut oil fatty acid N-methylethanolamide.

It is preferable that the rubber composition comprises silica as the white filler.

It is preferable that the rubber composition further comprises an antioxidant represented by the following formula (3) or an antioxidant represented by the following formula (4).

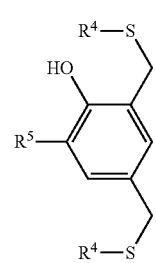

(3)

In the formula (3), each of $R^4$s independently represents a $C_1$ to $C_{20}$ alkyl group which may have a substituent, a phenyl group which may have a substituent or a benzyl group which may have a substituent, and $R^5$ is a $C_1$ to $C_{10}$ alkyl group which may have a substituent or a $C_5$ to $C_{12}$ cycloalkyl group which may have a substituent.

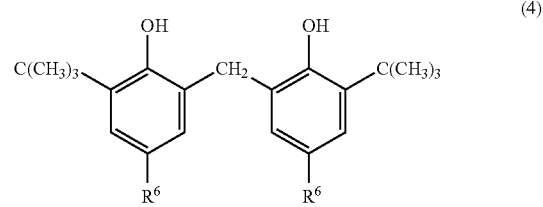

(4)

In the formula (4), each of $R^6$s independently represents a $C_1$ to $C_{10}$ alkyl group.

It is preferable that the rubber composition comprises no antioxidant having dihydroquinoline.

Effect of the Invention

According to the rubber composition of the present invention, a rubber composition having low rubber viscosity during kneading and good processability though the rubber composition comprises a white filler, and having good fuel efficiency and abrasion resistance can be provided.

DETAILED DESCRIPTION

The rubber composition of the present invention comprises a rubber component, a white filler and a compound represented by the following formula (1).

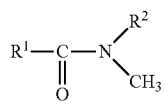

(1)

In the formula (1), $R^1$ represents an alkyl group or alkenyl group having 8 to 14 carbon atoms, the alkyl group or alkenyl group may be linear, branched or cyclic, and $R^2$ represents a hydroxyalkyl group, or a hydroxyalkyl group having an oxyalkylene unit.

The rubber component is not limited particularly, and example thereof include diene-based rubbers such as isoprene rubbers including natural rubber (NR) and polyisoprene rubber (IR), butadiene rubber (BR), styrene-butadiene copolymer rubber (SBR), styrene-isoprene-butadiene copolymer rubber (SIBR), chloroprene rubber (CR) and acrylonitrile-butadiene copolymer rubber (NBR), and butyl-based rubbers. These rubber components may be used alone or may be used in combination of two or more thereof. In particular, it is preferable that the rubber component comprises SBR and BR from the viewpoint of a balance of fuel efficiency, abrasion resistance, durability and wet grip performance.

Styrene butadiene rubber (SBR) is not limited particularly, and examples thereof include an emulsion-polymerized SBR (E-SBR), a solution-polymerized SBR (S-SBR) and the like. The SBR may be oil-extended or may not be oil-extended. Among these, the oil-extended high molecular weight SBR is preferable from the viewpoint of grip performance. Further, a terminal-modified S-SBR and a main chain-modified S-SBR which have enhanced interaction with a filler can also be used. These SBRs may be used alone or may be used in combination of two or more thereof.

A styrene content of the SBR is preferably not less than 16% by mass, more preferably not less than 20% by mass, further preferably not less than 25% by mass, particularly preferably not less than 30% by mass, from the viewpoint of grip performance. When the styrene content is too large, styrene groups become in proximity to each other, a polymer becomes too hard and crosslinking becomes non-uniform, which may deteriorate blowing property during running at high temperature, and further there is a tendency that since temperature dependency of the performances is increased and the performances can be changed largely with respect to a temperature change, stable grip performance cannot be obtained at a middle/latter stage of running. Therefore, the styrene content is preferably not more than 60% by mass, more preferably not more than 50% by mass, further preferably not more than 40% by mass. Herein, the styrene content of the SBR is calculated in accordance with $^1$H-NMR measurement.

A vinyl content of the SBR is preferably not less than 10%, more preferably not less than 15%, from the viewpoint of Hs of the rubber composition and grip performance. On the other hand, from the viewpoint of grip performance, EB (durability) and abrasion resistance, the vinyl content of the SBR is preferably not more than 90%, more preferably not more than 80%, further preferably not more than 70%, particularly preferably not more than 60%. It is noted that the vinyl content of SBR (an amount of 1,2-bond butadiene unit) as used herein can be determined by an infrared absorption spectrum analysis method.

Also a glass transition temperature (Tg) of the SBR is preferably not lower than −45° C., more preferably not lower than −40° C. The Tg is preferably not higher than 10° C. and from the viewpoint of prevention of a crack due to embrittlement during a winter season in the Temperate Zone, the Tg is preferably not higher than 5° C. It is noted that a glass-transition temperature of the SBR as used herein is a value measured by conducting a differential scanning calorimetry measurement (DSC) under the condition of a temperature elevation rate of 10° C./minute in accordance with JIS K 7121.

A weight-average molecular weight (Mw) of the SBR is preferably not less than 700,000, more preferably not less than 900,000, further preferably not less than 1,000,000 from the viewpoint of grip performance and blowing property. On the other hand, the weight-average molecular weight is preferably not more than 2,000,000, more preferably not more than 1,800,000 from the viewpoint of blowing property. It is noted that the weight-average molecular weight of the SBR as used herein can be calibrated with polystyrene standards based on measurement values determined with a gel permeation chromatography (GPC) (GPC-8000 series manufactured by Tosoh Corporation; detector: differential refractometer; column: TSKGEL SUPERMALTPORE HZ-M manufactured by Tosoh Corporation).

An SBR content in the rubber component is preferably not less than 40% by mass, more preferably not less than 50% by mass, more preferably not less than 60% by mass, for the reason that a sufficient grip performance can be obtained. In the case of a racing tire, the SBR content is particularly preferably not less than 80% by mass, and from the viewpoint of grip performance, is preferably 100% by mass.

Particularly for the reason that higher grip performance and blowing property can be exhibited, it is preferable that the rubber component comprises 40% by mass or more of SBR having a styrene content of 16 to 60% by mass, and it is more preferable that the rubber component comprises 50% by mass or more of SBR having a styrene content of 25 to 55% by mass.

The BR is not limited particularly, and for example, BRs having a high-cis content such as BR1220 available from ZEON CORPORATION, and BR130B and BR150B available from Ube Industries, Ltd.; modified BRs such as BR1250H available from ZEON CORPORATION; BRs having syndiotactic polybutadiene crystal such as VCR412 and VCR617 available from Ube Industries, Ltd.; BRs synthesized using a rare-earth element catalyst such as BUNA-CB25 available from LANXESS Japan, and the like. These BRs may be used alone or may be used in combination of two or more thereof. Particularly BRs synthesized using a rare-earth element catalyst (rare-earth BRs) are preferable from the viewpoint of fuel efficiency and abrasion resistance.

The above-mentioned rare-earth BRs are butadiene rubbers synthesized using a rare-earth element catalyst, and is featured by a large cis-content and a low vinyl content. Those which are used generally in manufacturing of a tire can be used as the rare-earth BR.

Well-known rare-earth element catalysts used for the synthesis of the rare-earth BR can be used, and examples thereof include lanthanum-based rare-earth element compounds, organoaluminum compounds, aluminoxane, halogen-containing compounds, catalysts including Lewis base as needed, and the like. Among these, particularly preferable are Nd-based catalysts prepared using a neodymium (Nd)-containing compound as the lanthanum-based rare-earth element compound.

Examples of the lanthanum-based rare-earth element compound include halides, carboxylates, alcoholates, thioalcoholates, amides and the like of rare earth metals having an atomic number of 57 to 71. Among these, particularly preferable are the above-mentioned Nd-containing compounds from the viewpoint that BRs having a high cis-content and a low vinyl content can be obtained.

Examples of the usable organoaluminum compound include those represented by $AlR^aR^bR^c$, wherein $R^a$, $R^b$ and $R^e$ are the same or different and each represents hydrogen or a hydrocarbon group having 1 to 8 carbon atoms. Examples of the aluminoxane include chain aluminoxane and cyclic aluminoxane. Examples of the halogen-containing compound include halogenated aluminum represented by $AlX_kR^d_{3-k}$, wherein X represents halogen, $R^d$ represents an alkyl group, aryl group or aralkyl group having 1 to 20 carbon atoms, k represents 1, 1.5, 2 or 3; strontium halides such as $Me_3SrCl$, $Me_2SrCl_2$, $MeSrHCl_2$ and $MeSrCl_3$; and metallic halides such as silicon tetrachloride, tin tetrachloride and titanium tetrachloride. The Lewis base is used for complexation of the lanthanum-based rare-earth element compounds, and acetylacetone, ketone, alcohol and the like are used suitably.

When polymerizing a butadiene, the rare-earth element catalyst may be used in a state of being dissolved in an organic solvent (n-hexane, cyclohexane, n-heptane, toluene, xylene, benzene or the like), or may be used being carried on a suitable carrier such as silica, magnesia, magnesium chloride or the like. The polymerization may be carried out by either of a solution polymerization or a bulk polymerization. The polymerization temperature is preferably from −30° to 150° C., and the polymerization pressure may be optionally selected depending on other polymerization conditions.

A cis-1,4 bond content (cis content) of the rare-earth BR is preferably not less than 90% by mass, more preferably not less than 93% by mass, more preferably not less than 95% by mass, from the viewpoint of durability and abrasion resistance.

A vinyl content of the rare-earth BR is preferably not more than 1.8% by mass, more preferably not more than 1.5% by mass, further preferably not more than 1.0% by mass, particularly preferably not more than 0.8% by mass, from the viewpoint of durability and abrasion resistance. It is noted that the vinyl content (an amount of 1,2-bond butadiene unit) and the cis content (cis-1,4 bond content) of BR as used herein can be determined by an infrared absorption spectrum analysis method.

When the rubber component comprises the BR, a content of the BR in the rubber component is preferably not less than 10% by mass, more preferably not less than 15% by mass, further preferably not less than 20% by mass, from the viewpoint of abrasion resistance, grip performance and fuel efficiency. On the other hand, the content of the BR is preferably not more than 70% by mass, more preferably not more than 60% by mass, from the viewpoint of abrasion resistance, grip performance and fuel efficiency, and in a case of a tire requiring grip performance, the content of the BR is preferably not more than 40% by mass.

Examples of the white filler include aluminum hydroxide, alumina (aluminum oxide), calcium carbonate, talc and the like, and these white fillers can be used alone or can be used in combination of two or more thereof. For the reason that abrasion resistance, durability, wet grip performance and fuel efficiency are good, it is preferable that the rubber composition comprises silica and/or aluminum hydroxide.

A BET specific surface area of the silica is preferably from 70 to 300 m²/g, more preferably from 80 to 280 m²/g, further preferably from 90 to 250 m²/g, from the viewpoint of abrasion resistance, wet grip performance and processability. It is noted that the $N_2SA$ of the silica as used herein is a value measured by a BET method in accordance with ASTM D3037-81.

When the rubber composition comprises the silica, the content of the silica is preferably not less than 40 parts by mass, more preferably not less than 50 parts by mass based on 100 parts by mass of the rubber component, from the viewpoint of wet grip performance. On the other hand, the content of the silica is preferably not more than 150 parts by mass, more preferably not more than 140 parts by mass, from the viewpoint of processability and for inhibiting shrinkage due to cooling after vulcanization and securing a breaking strength (TB).

It is preferable that the silica is used in combination with a silane coupling agent. Any silane coupling agent which has been used in combination with silica in the rubber industry can be used as the silane coupling agent, and examples thereof include: sulfide silane coupling agents such as bis(3-triethoxysilylpropyl)disulfide and bis(3-triethoxysilylpropyl)tetrasulfide; mercapto silane coupling agents (mercapto group-containing silane coupling agents) such as 3-mercaptopropyltrimethoxysilane, and NXT-Z100, NXT-Z45 and NXT manufactured by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone or may be used in combination with two or more thereof. Among them, sulfide silane coupling agents and mercapto silane coupling agents are preferable from the viewpoint of their strong binding force with silica and good fuel efficiency. In addition, mercapto silane coupling agents are more preferable since they can suitably improve fuel efficiency and abrasion resistance.

While the mercapto silane coupling agents are good in fuel efficiency and abrasion resistance, there is a problem that in the case where the rubber composition comprises polymerized 2,2,4-trimethyl-1,2-dihydroquinoline (TMQ) as an antioxidant, a radical chain reaction occurs. However, when the rubber composition comprises the antioxidant represented by the formula (3) described infra or the antioxidant represented by the formula (4) described infra, a radical reaction to be caused by the mercapto silane coupling agent can be inhibited. Further, it is preferable that the rubber composition does not comprise an antioxidant having dihydroquinoline such as TMQ since a radical reaction caused by the mercapto silane coupling agent can be inhibited more.

When the rubber composition comprises the silane coupling agent, the content of the silane coupling agent is preferably not less than 4.0 parts by mass, more preferably not less than 6.0 parts by mass based on 100 parts by mass of the silica, from the viewpoint that an effect of improving dispersion of the filler sufficiently and an effect of decreasing a viscosity can be obtained. On the other hand, the content of the silane coupling agent is preferably not more than 12 parts by mass, more preferably not more than 10 parts by mass, from the viewpoint that a sufficient coupling effect and silica dispersing effect are not obtained and a reinforcing property is reduced.

A BET specific surface area of the aluminum hydroxide is preferably not less than 5 m$^2$/g, preferably not less than 10 m$^2$/g, more preferably not less than 12 m$^2$/g, from the viewpoint of wet grip performance. On the other hand, the BET specific surface area of the aluminum hydroxide is preferably not more than 50 m$^2$/g, more preferably not more than 45 m$^2$/g, further preferably not more than 40 m$^2$/g, from the viewpoint of dispersion and prevention of re-agglomeration of the aluminum hydroxide and abrasion resistance. It is noted that the BET specific surface area of the aluminum hydroxide as used herein is a value measured by a BET method in accordance with ASTM D3037-81.

An average particle size (D50) of the aluminum hydroxide is preferably not less than 0.1 μm, more preferably not less than 0.2 μm, further preferably not less than 0.3 μm, from the viewpoint of dispersion and prevention of re-agglomeration of the aluminum hydroxide and abrasion resistance. On the other hand, the average particle size (D50) of the aluminum hydroxide is preferably not more than 3.0 μm, more preferably not more than 2.0 μm, from the viewpoint of abrasion resistance. It is noted that the average particle size (D50) as used herein is a particle size of 50% of an integrated mass value in a particle size distribution curve obtained by means of a particle size distribution measuring device.

When the rubber composition comprises the aluminum hydroxide, a content thereof based on 100 parts by mass of the rubber component is preferably not less than 1 part by mass, more preferably not less than 2 parts by mass, further preferably not less than 5 parts by mass, from the viewpoint of grip performance. On the other hand, the content of the aluminum hydroxide is preferably not more than 50 parts by mass, more preferably not more than 45 parts by mass, further preferably not more than 40 parts by mass, from the viewpoint of abrasion resistance.

The rubber composition of the present invention is characterized by comprising the compound represented by the following formula (1).

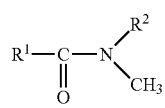

(1)

In the formula (1), R$^1$ represents an alkyl group or alkenyl group having 8 to 14 carbon atoms, the alkyl group or alkenyl group may be linear, branched or cyclic, and R$^2$ represents a hydroxyalkyl group or a hydroxyalkyl group having an oxyalkylene unit.

When the rubber composition comprises this compound, the surfaces of the white fillers are covered with this compound and the silane coupling agent, thereby inhibiting agglomeration of the white fillers and enabling a viscosity of compounding components to be decreased, and therefore, dispersion of the white filler in the rubber can be improved efficiently. Further, agglomeration of the white fillers is inhibited and an occluded rubber enfolded in the agglomerate of the white fillers can be decreased. As a result, processability of the rubber composition, fuel efficiency and abrasion resistance can be also enhanced.

The compound represented by the formula (1) is characterized in that nitrogen atoms are methylated, namely one of substituents bonded to the nitrogen atom is methyl as compared with fatty acid monoethanolamide and fatty acid diethanolamide compounded to improve processability and the like of a conventional rubber composition comprising a white filler. By methylating nitrogen atoms, crystallization is hard to arise and the compound is in a liquid form at normal temperature, thereby leading to an good effect of decreasing a viscosity of the compounding components and enhancing dispersion of the white filler in the rubber.

R$^1$ in the formula (1) is an alkyl group or alkenyl group having 8 to 14 carbon atoms from the viewpoint of a viscosity of the compounding components, a scorch time and a fuel efficiency, and the alkyl group and alkenyl group may be any of linear, branched or cyclic group. Examples thereof include alkyl groups such as octyl, nonyl, isononyl, decyl, undecyl, dodecyl (lauryl), tridecyl and isotridecyl and alkenyl groups such as octene, nonene and decene. Further, the compound may be coconut oil fatty acid comprising two or more compounds having different alkyl groups and/or alkenyl groups. Preferred examples of fatty acids being starting materials of such compounds include lauric acid, tridecyl acid, myristic acid, coconut oil fatty acid, palm kernel oil fatty acid and the like. When the number of carbon atoms of R$^1$ in the formula (1) exceeds 14, there is a tendency that a density of polar groups such as amide and OH group becomes low and a polarity is decreased, thereby resulting in lowering of an adsorption on the surface of the white filler.

Further, R$^2$ in the formula (1) is a hydroxyalkyl group or a hydroxyalkyl group having an oxyalkylene unit. The above-mentioned alkyl group is preferably a linear or branched alkyl group having 1 to 6 carbon groups, more preferably an alkyl group having 1 to 3 carbon groups. R$^2$ in the formula (1) is preferably one represented by the following formula (2), and it is preferable that R$^3$ is an alkylene group having 1 to 6 carbon atoms, and "n" is the number of 1 to 5.

(2)

In particular, R$^3$ is preferably ethylene or propylene, and "n" is preferably from 1 to 3, more preferably 1. It is more preferable that R$^3$ is ethylene and "n" is 1. It is noted that "n" R$^3$s may be the same or different.

Examples of the specific compounds represented by the formula (1) include coconut oil fatty acid N-methylethanolamide, palm kernel oil fatty acid N-methylethanolamide, lauric acid N-methylethanolamide and the like.

A content of the compound represented by the formula (1) is preferably not less than 0.5 part by mass, more preferably not less than 1.0 part by mass based on 100 parts by mass of the rubber component, for the reason that the compound covers the surfaces of the white fillers and exhibits a viscosity decreasing effect. On the other hand, the content of the compound is preferably not more than 10 parts by mass, more preferably not more than 5 parts by mass, for the reason that deterioration by thermal oxidation is inhibited effectively and a reaction between the rubber component and the white filler is not inhibited.

When compounding the compound represented by the formula (1) into rubber compounding comprising the white filler, it is conjectured that the compound hydrophobizes the surface of the white filler, thereby inhibiting agglomeration of silica and improving processability. Further, the methylated compound represented by the formula (1) is in a liquid form as mentioned above, thereby enabling a viscosity of the rubber compounding to be decreased and dispersion of the white filler in the rubber to be enhanced more.

In addition to the above-mentioned components, to the rubber composition of the present disclosure can be properly added other compounding agents generally used in the tire industry, for example, carbon black, resin components, oil, zinc oxide, stearic acid, an anti-oxidant, a wax, a vulcanizing agent, a vulcanization accelerator and the like.

A nitrogen adsorption specific surface area ($N_2SA$) of the carbon black is not less than 80 $m^2/g$, preferably not less than 100 $m^2/g$, more preferably not less than 140 $m^2/g$, further preferably not less than 151 $m^2/g$, particularly preferably not less than 195 $m^2/g$, from the viewpoint of grip performance. On the other hand, from the viewpoint of securing good dispersion of the filler, the $N_2SA$ is preferably not more than 600 $m^2/g$, more preferably not more than 500 $m^2/g$, further preferably not more than 400 $m^2/g$. It is noted that the $N_2SA$ of the carbon black is measured by a BET method in accordance with JIS K6217-2:2001.

The content of the carbon black is not less than 3 parts by mass based on 100 parts by mass of the rubber component for the reason of securing performance for preventing cracking due to ultraviolet ray. A preferred carbon black content varies with a kind of a tire member to be used, and an expected grip performance, abrasion resistance and fuel efficiency of a tire. In the case of a tread portion of a general-purpose tire, namely a tire in which wet grip performance is secured by means of silica, the content of the carbon black based on 100 parts by mass of the rubber component is preferably from 5 to 30 parts by mass. Meanwhile, in the case of a tread portion of a race tire, namely a tire in which dry grip performance and abrasion resistance are secured by means of carbon black, the content of the carbon black based on 100 parts by mass of the rubber component is preferably from 40 to 140 parts by mass.

It is preferable that the rubber composition comprises an antioxidant represented by the following formula (3) or an antioxidant represented by the following formula (4) for the reasons that a radical chain reaction during kneading can be inhibited and weather resistance and a property of preventing deterioration by thermal oxidation which are required for a tire tread can be enhanced.

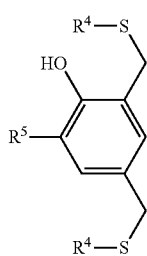

(3)

In the formula (3), each of $R^4$s independently represents a $C_1$ to $C_{20}$ alkyl group which may have a substituent, a phenyl group which may have a substituent or a benzyl group which may have a substituent, and $R^5$ represents a $C_1$ to $C_{10}$ alkyl group which may have a substituent or a $C_5$ to $C_{12}$ cycloalkyl group which may have a substituent.

Examples of the $C_1$ to $C_{20}$ alkyl group of $R^4$ include methyl, ethyl, n-propyl, isopropyl, n-butyl, sec-butyl, t-butyl, isobutyl, n-pentyl, isopentyl, neopentyl, t-pentyl, n-hexyl, isohexyl, 1-methylpentyl, 2-methylpentyl, n-heptyl, n-octyl, n-notyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl and the like. Among these, a $C_8$ to $C_{12}$ alkyl group is preferable, and a $C_8$ n-octyl group and a $C_{12}$ n-dodecyl group are more preferable.

Further, in the $R^5$, namely the $C_1$ to $C_{20}$ alkyl group which may have a substituent, the phenyl group which may have a substituent or the benzyl group which may have a substituent, examples of the substituent include a hydroxyl group; halogen atoms such as fluorine atom, chlorine atom, bromine atom and iodine atom; $C_1$ to $C_6$ alkyl groups such as methyl, ethyl, n-propyl, isopropyl, n-butyl, sec-butyl, t-butyl, n-pentyl, isopentyl, neopentyl, t-pentyl, n-hexyl, isohexyl, 1-methylpentyl and 2-methylpentyl; $C_1$ to $C_6$ alkoxyl groups such as methoxy, ethoxy, n-propoxy, isopropoxy, n-butoxy, sec-butoxy and t-butoxy; —$OCOR^7$ group, —$COOR^8$ group, —$CONR^9R^{10}$ group, and the like.

Each of $R^7$ and $R^8$ independently represents a $C_1$ to $C_{20}$ alkyl group or a $C_2$ to $C_8$ alkenyl group, and each of $R^9$ and $R^{10}$ independently represents hydrogen, a $C_1$ to $C_{20}$ alkyl group or a $C_2$ to $C_8$ alkenyl group.

Examples of the $C_1$ to $C_{20}$ alkyl group include those similar to the examples of $R^4$. Examples of the $C_2$ to $C_8$ alkenyl group include vinyl, allyl, isopropenyl, 1-propenyl, 2-propenyl, 1-butenyl, 2-butenyl, 3-butenyl, 1,3-butanedienyl, 2-methyl-2-propenyl and the like.

Examples of the $C_1$ to $C_{10}$ alkyl group of $R^5$ include those exemplified above as the example of $R^4$ and satisfying the condition of $C_1$ to $C_{10}$. Among these, the $C_1$ to $C_3$ alkyl groups are preferable, and methyl is more preferable.

Examples of the $C_5$ to $C_{12}$ cycloalkyl group include cyclopentyl, cyclohexyl, cyclooctyl, cyclodecyl and the like. Examples of the substituent of the $C_1$ to $C_{10}$ alkyl group which may have a substituent or a $C_3$ to $C_{12}$ cycloalkyl group which may have a substituent include a hydroxyl group; halogen atoms such as fluorine atom, chlorine atom, bromine atom and iodine atom; $C_1$ to $C_6$ alkyl groups such as methyl, ethyl, n-propyl, isopropyl, n-butyl, sec-butyl, t-butyl, n-pentyl, isopentyl, neopentyl, t-pentyl, n-hexyl, isohexyl, 1-methylpentyl, 2-methylpentyl; $C_1$ to $C_6$ alkoxyl groups such as methoxy, ethoxy, n-propoxy, isopropoxy, n-butoxy, sec-butoxy and t-butoxy; and the like.

Examples of the specific antioxidant represented by the formula (3) include 4,6-bis(octylthiomethyl)-o-cresol (ANTAGE HP-400 manufactured by Kawaguchi Chemical Industry Co., Ltd., IRGANOX1520L manufactured by BASF Japan), 4,6-bis(dodecylthiomethyl)-o-cresol (ANTAGE HP-500 manufactured by Kawaguchi Chemical Industry Co., Ltd., IRGANOX1726 manufactured by BASF Japan) and the like.

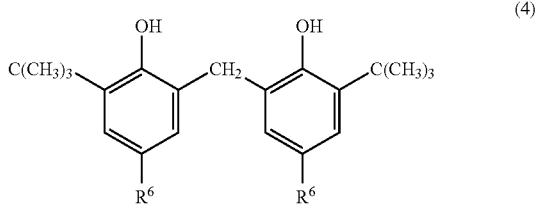

(4)

In the formula (4), each of $R^6$s independently represents a $C_1$ to $C_{10}$ alkyl group.

Examples of the $C_1$ to $C_{10}$ alkyl group of $R^6$ include methyl, ethyl, n-propyl, isopropyl, n-butyl, sec-butyl, t-butyl, isobutyl, n-pentyl, isopentyl, neopentyl, t-pentyl, n-hexyl, isohexyl, 1-methylpentyl, 2-methylpentyl, n-heptyl, n-octyl, n-notyl, n-decyl and the like. Among these, the $C_1$ to $C_3$ alkyl groups are preferable, and methyl and ethyl are more preferable.

Examples of the specific antioxidant represented by the formula (4) include 2,2'-methylene-bis(4-methyl-6-tert-butylphenol) (ANTAGE W-400 manufactured by Kawaguchi Chemical Industry Co., Ltd.), 2,2'-methylene-bis(4-ethyl-6-tert-butylphenol) (ANTAGE W-500 manufactured by Kawaguchi Chemical Industry Co., Ltd.) and the like.

A content of the antioxidant represented by the formula (3) or the antioxidant represented by the formula (4) is preferably not less than 0.1 part by mass, more preferably not less than 0.5 part by mass, further preferably not less than 0.7 part by mass based on 100 parts by mass of the rubber component. When the content is less than 0.1 part by mass, an effect by the antioxidant tends to be insufficient. On the other hand, the content of the antioxidant is preferably not more than 10 parts by mass, more preferably not more than 3.0 parts by mass, further preferably not more than 2.5 parts by mass. When the content exceeds 10 parts by mass, a fuel efficiency tends to be deteriorated.

The rubber composition may comprise other antioxidant in addition to the antioxidant represented by the formula (3) or (4). The other antioxidant is not limited particularly, and those used in a field of a rubber are usable. Examples thereof include quinoline-based, quinone-based, phenol-based and phenylenediamine-based antioxidants and the like. A phenylenediamine-based antioxidant can be used suitably since it is an antioxidant of radical chain reaction prohibition type and can terminate a radical chain reaction. Examples of the phenylenediamine antioxidant include the above-mentioned N-phenyl-N'-(1,3-dimethylbutyl)-p-phenylenediamine (6PPD) and the like.

A compounding amount of the other antioxidant is not limited particularly, and may be an amount usually compounded. The phenylenediamine-based antioxidant has both of ozone resistance and a property of preventing deterioration by thermal oxidation, and therefore, the compounding amount thereof is preferably not less than 1 part by mass, more preferably not less than 2 parts by mass based on 100 parts by mass of the rubber component. On the other hand, the compounding amount is preferably not more than 5.0 parts by mass, more preferably not more than 4.5 parts by mass from the viewpoint of a fuel efficiency.

It is noted that an antioxidant having dihydroquinoline such as polymerized 2,2,4-trimethyl-1,2-dihydroquinoline (TMQ) may cause a chain deterioration reaction due to a radical reaction during kneading, thereby causing cleavage of a polymer. Therefore, a content of the antioxidant having dihydroquinoline is preferably not more than 0.5 part by mass, more preferably not more than 0.3 part by mass, more preferably 0 part by mass based on 100 parts by mass of the rubber component (The rubber composition does not substantially comprise the antioxidant having dihydroquinoline).

The rubber composition of the present disclosure can be prepared by a usual method. The rubber composition can be prepared, for example, by kneading the above-mentioned components except the vulcanizing agent and the vulcanization accelerator with a known kneading apparatus usually used in the rubber industry such as a Banbury mixer, a kneader or an open roll and then adding the vulcanizing agent and the vulcanization accelerator and further kneading the mixture and then carrying out vulcanization.

The rubber composition of the present disclosure can be used not only for a tread, an under tread, a carcass, a side wall, a bead and the like of a tire but also for a vibration proof rubber, a belt, a hose and other industrial products made of a rubber. In particular it is preferable that the rubber composition is used for a tire composed of a tread made of the rubber composition of the present disclosure since wet grip performance and abrasion resistance can be improved.

A tire produced using the rubber composition of the present disclosure can be produced by usual methods. Namely, the tire can be produced by subjecting a rubber composition prepared by compounding the above-mentioned additives with the diene rubber component according to necessity, to extrusion processing to a shape of a tread or the like, and then laminating together with other tire members on a tire building machine and forming by a usual forming method, thus forming an unvulcanized tire, and heating and compressing this unvulcanized tire in a vulcanizer.

EXAMPLE

The present disclosure will be described in detail based on Examples, but the present disclosure is not limited thereto only.

A variety of chemicals used in Examples and Comparative Examples will be explained below.

Modified SBR: prepared in accordance with a method of preparing a modified SBR mentioned later (an oil-extended rubber containing 37.5 parts of oil, styrene content: 41% by mass, vinyl content: 40%, Tg: −29° C., weight-average molecular weight: 1,190,000)

BR: CB24 (high-cis BR synthesized using an Nd-based catalyst, Tg: −110° C.) manufactured by LANXESS Japan Carbon black: SHOBLACK N110 ($N_2SA$: 142 $m^2/g$) manufactured by Cabot Japan K.K.

Silica 1: ULTRASIL VN3 ($N_2SA$: 175 $m^2/g$) manufactured by Evonik Degussa

Silica 2: ULTRASIL U9000Gr ($N_2SA$: 235 $m^2/g$) manufactured by Evonik Degussa Silane coupling agent 1: Si75 (bis(3-triethoxysilylpropyl) disulfide) manufactured by Evonik Degussa Silane coupling agent 2: NXT (8-mercaptooctanoyltriethoxysilane)manufactured by Momentive Performance Materials Inc.

Silane coupling agent 3: NXT-Z45 manufactured by Momentive Performance Materials Inc.

Aluminum hydroxide: Ath#B manufactured by Sumitomo Chemical Co., Ltd. (average particle size: 0.6 μm, $N_2SA$: 15 $m^2/g$)

Wax: OZOACE 355 manufactured by Nippon Seiro Co., Ltd.

Antioxidant 1: Antigen 6C (6PPD, N-(1,3-dimethylbutyl)-N'-phenyl-p-phenylenediamine) manufactured by Sumitomo Chemical Co., Ltd.

Antioxidant 2: Nocrac 224 (TMQ, Polymerized 2,2,4-trimethyl-1,2-dihydroquinoline) manufactured by OUCHI SHINKO CHEMICAL INDUSTRIAL CO., LTD.

Antioxidant 3: ANTAGE W-400 (2,2'-methylene-bis(4-methyl-6-butylphenol)) manufactured by Kawaguchi Chemical Industry Co., Ltd.

Antioxidant 4: ANTAGE HP-400 (4,6-bis(octylthiomethyl)-o-cresol) manufactured by Kawaguchi Chemical Industry Co., Ltd.

Antioxidant 5: ANTAGE HP-500 (4,6-bis(dodecylthiomethyl)-o-cresol) manufactured by Kawaguchi Chemical Industry Co., Ltd.

Compound 1: A prototype (coconut oil fatty acid N-methylethanolamide) manufactured by Sanyo Chemical Industries, Ltd.

Compound 2: PROFAN SME (stearic acid monoethanolamide) manufactured by Sanyo Chemical Industries, Ltd.

Compound 3: PROFAN AB-20 (coconut oil fatty acid monoethanolamide) manufactured by Sanyo Chemical Industries, Ltd.

Compound 4: PROFAN EXTRA 24 (coconut oil fatty acid diethanolamide) manufactured by Sanyo Chemical Industries, Ltd.

Compound 5: IONET S-20 (coconut oil fatty acid sorbitan) manufactured by Sanyo Chemical Industries, Ltd.

Compound 6: EF44 (fatty acid zinc) manufactured by Struktol GmbH

Process oil: VivaTec 500 (TDAE oil, Tg: −58° C.) manufactured by H&R

Resin: M125 (hydrogenated styrene-terpene resin, SP value: 8.52, softening point: 125° C., Tg: 65° C.) manufactured by Yasuhara Chemical Co., Ltd.

Zinc oxide: Zinc Oxide No. 2 manufactured by Mitsui Mining & Smelting Co., Ltd.

Stearic acid: "Tsubaki" manufactured by NOF Corporation

Sulfur: HK-200-5 (containing 5% by mass of oil) manufactured by Hosoi Chemical Industry Co., Ltd.

Vulcanization accelerator 1: Nocceler NS-G (TBBS N-tert-butyl-2-benzothiazolesulfenamide) manufactured by OUCHI SHINKO CHEMICAL INDUSTRIAL CO., LTD.

Vulcanization accelerator 2: Nocceler D (DPG 1,3-diphenylguanidine) manufactured by OUCHI SHINKO CHEMICAL INDUSTRIAL CO., LTD.

Preparation Method of Modified SBR (1) Preparation of Terminal Modifier

Under nitrogen atmosphere, 20.8 g of 3-(N,N-dimethylamino)propyltrimethoxysilane (manufactured by Azmax Co.) was poured into a 250 ml measuring flask and further anhydrous hexane (manufactured by Kanto Chemical Industry Co., Ltd.) was added thereto to obtain a terminal modifier in a total amount of 250 ml.

(2) Preparation of Modified SBR

Into a 30 L pressure resistant vessel having been subjected to replacement with nitrogen were poured 18 L of n-hexane, 800 g of styrene (manufactured by Kanto Chemical Industry Co., Ltd.), 1,200 g of butadiene and 1.1 mmol of tetramethylethylenediamine, followed by heating a mixture up to 40° C. Next, 1.8 mL of 1.6 M butyl lithium (manufactured by Kanto Chemical Industry Co., Ltd.) was added to the mixture, and the mixture was heated up to 50° C., followed by 3-hour stirring. Next 4.1 mL of the terminal modifier was added to the mixture, followed by 30-minute stirring. After adding 15 mL of methanol and 0.1 g of 2,6-tert-butyl-p-cresol (manufactured by OUCHI SHINKO CHEMICAL INDUSTRIAL CO., LTD.) into a reaction solution, 1,200 g of TDAE was added thereto, followed by 10-minute stirring. Thereafter an aggregate was recovered from a polymer solution by steam stripping treatment. The obtained aggregate was subjected to drying under reduced pressure for 24 hours to obtain a modified SBR. An amount of bonded styrene was 41% by mass. A bonded styrene amount was 41% by mass, a vinyl content was 40%, Tg was −29° C. and Mw was 1,190,000.

EXAMPLES AND COMPARATIVE EXAMPLES

According to compounding formulations shown in Tables 1 and 2, chemicals other than sulfur and a vulcanization accelerator were kneaded with a 1.7 L enclosed Banbury mixer at a discharge temperature of 170° C. for 5 minutes to obtain a kneaded product. Further, the obtained kneaded product was kneaded with the Banbury mixer at a discharge temperature of 150° C. for 4 minutes (remilled). Then, to the obtained kneaded product were added sulfur and the vulcanization accelerator, and the mixture was kneaded using a biaxial open roll for 4 minutes until the temperature reached 105° C. to obtain an unvulcanized rubber composition. The obtained unvulcanized rubber composition was subjected to vulcanization molding at 170° C. for 12 minutes at a pressure of 25 kgf/cm$^2$ to obtain a rubber composition for test.

Furthermore, the unvulcanized rubber composition was extrusion-molded using an extruder with an extrusion nozzle having a specific shape, and then laminated with other tire members to form an unvulcanized tire, followed by press-vulcanization at 170° C. for 12 minutes to produce a test tire. The following evaluations were made using the obtained rubber compositions for test and test tires. The results of the evaluations are shown in Tables 1 and 2.

<Viscosity Index>

A Mooney viscosity ($ML_{1+4}$) of each of the unvulcanized rubber compositions was determined under the temperature condition of 130° C. according to JIS K 6300-1 "Unvulcanized rubber—Physical properties—Part. 1: Method for measuring viscosity and scorch time using a Mooney viscometer". Assuming that an inverse number of a Mooney viscosity of Comparative Example 1 is 100, a Mooney viscosity of each formulation was expressed as an index. As the index is larger, the Mooney viscosity is lower and processability is better. A performance target value is 115 or more.

Fuel Efficiency Index

A loss tangent tan δ of each of the rubber compositions for test was measured under the conditions of a temperature of 50° C., a frequency of 10 Hz, an initial strain of 10% and a dynamic strain of 2%, using a viscoelasticity spectrometer VES manufactured by Iwamoto Seisakusyo K. K. The smaller the tan δ is, the lower a heat build-up property is and the better a fuel efficiency is. Assuming that an inverse number of the tan δ of Comparative Example 1 is 100, a fuel efficiency was expressed as an index. The larger the index is, the better the fuel efficiency is. A performance target value of the fuel efficiency index is 97 or more.

Abrasion Resistance Index

Each of the test tires was loaded on a domestic FR2000 cc vehicle and in-vehicle long running of 500 km was conducted on an Okayama International Circuit.

Running mode: Severe handling including an eight figure sharp turning to such an extent that a tread main groove is 1 mm shaved at a running speed of 20 km.

After the running, a remaining groove depth of the tire tread rubber (initial depth: 8.0 mm) was measured and evaluated as an abrasion resistance. The larger an average remaining groove depth of the tread main groove is, the better the abrasion resistance is. The remaining groove depth was expressed as an index relative to that in Comparative Example 1 taken as 100. A larger index value indicates higher abrasion resistance. A performance target value of the abrasion resistance index is 97 or more.

TABLE 1

|  | Example |  |  |  |  |  |  |  |  |
|---|---|---|---|---|---|---|---|---|---|
|  | 1 | 2 | 3 | 4 | 5 | 6 | 7 | 8 | 9 |
| Compounding amount (part by mass) | | | | | | | | | |
| Modified SBR | 96.3 | 96.3 | 96.3 | 96.3 | 96.3 | 96.3 | 96.3 | 96.3 | 96.3 |
| BR | 30 | 30 | 30 | 30 | 30 | 30 | 30 | 30 | 30 |
| Carbon black | 5 | 5 | 5 | 5 | 5 | 5 | 5 | 5 | 5 |
| Silica 1 | 100 | 100 | 100 | 80 | 80 | 80 | 80 | 70 | 80 |
| Silica 2 | — | — | — | 20 | 20 | 20 | 20 | 25 | 20 |
| Silane coupling agent 1 | 8 | 8 | 8 | — | — | — | — | — | — |
| Silane coupling agent 2 | — | — | — | 8 | 8 | 8 | 8 | 7.6 | — |
| Silane coupling agent 3 | — | — | — | — | — | — | — | — | 8 |
| Aluminum hydroxide | — | — | — | — | — | — | — | 10 | — |
| Wax | 1 | 1 | 1 | 1 | 1 | 1 | 1 | 1 | 1 |
| Antioxidant 1 | 2 | 2 | 2 | 2 | 2 | 2 | 2 | 2 | 2 |
| Antioxidant 2 | 1.5 | 1.5 | 1.5 | 1.5 | — | — | — | — | — |
| Antioxidant 3 | — | — | — | — | 1.5 | — | — | — | — |
| Antioxidant 4 | — | — | — | — | — | 1.5 | — | 1.5 | 1.5 |
| Antioxidant 5 | — | — | — | — | — | — | 1.5 | — | — |
| Compound 1 | 3 | 1 | 6 | 3 | 3 | 3 | 3 | 3 | 3 |
| Compound 2 | — | — | — | — | — | — | — | — | — |
| Compound 3 | — | — | — | — | — | — | — | — | — |
| Compound 4 | — | — | — | — | — | — | — | — | — |
| Compound 5 | — | — | — | — | — | — | — | — | — |
| Compound 6 | — | 1 | — | — | — | — | — | — | — |
| Process oil | — | — | — | — | — | — | — | — | — |
| Resin | 5 | 5 | 5 | 5 | 5 | 5 | 5 | 5 | 5 |
| Zinc oxide | 2 | 2 | 2 | 2 | 2 | 2 | 2 | 2 | 2 |
| Stearic acid | 3 | 3 | 3 | 3 | 3 | 3 | 3 | 3 | 3 |
| Sulfur (containing 5% oil) | 1.5 | 1.5 | 1.5 | 1.5 | 1.5 | 1.5 | 1.5 | 1.5 | 1.5 |
| Vulcanization accelerator 1 | 2.5 | 2.5 | 2.5 | 2.5 | 2.5 | 2.5 | 2.5 | 2.5 | 2.5 |
| Vulcanization accelerator 2 | 2 | 2 | 2 | 2 | 2 | 2 | 2 | 2 | 2 |
| Results of evaluation | | | | | | | | | |
| Viscosity index | 121 | 115 | 130 | 127 | 132 | 134 | 131 | 139 | 122 |
| Fuel efficiency index | 101 | 101 | 97 | 110 | 114 | 116 | 114 | 118 | 136 |
| Abrasion resistance index | 100 | 97 | 97 | 108 | 115 | 117 | 115 | 117 | 135 |

TABLE 2

|  | Comparative Example |  |  |  |  |  |  |
|---|---|---|---|---|---|---|---|
|  | 1 | 2 | 3 | 4 | 5 | 6 | 7 |
| Compounding amount (part by mass) | | | | | | | |
| Modified SBR | 96.3 | 96.3 | 96.3 | 96.3 | 96.3 | 96.3 | 96.3 |
| BR | 30 | 30 | 30 | 30 | 30 | 30 | 30 |
| Carbon black | 5 | 5 | 5 | 5 | 5 | 5 | 5 |
| Silica 1 | 100 | 100 | 100 | 100 | 100 | 100 | 80 |
| Silica 2 | — | — | — | — | — | — | 20 |
| Silane coupling agent 1 | 8 | 8 | 8 | 8 | 8 | 8 | — |
| Silane coupling agent 2 | — | — | — | — | — | — | 8 |
| Silane coupling agent 3 | — | — | — | — | — | — | — |
| Aluminum hydroxide | — | — | — | — | — | — | — |
| Wax | 1 | 1 | 1 | 1 | 1 | 1 | 1 |
| Antioxidant 1 | 2 | 2 | 2 | 2 | 2 | 2 | 2 |
| Antioxidant 2 | 1.5 | 1.5 | 1.5 | 1.5 | 1.5 | 1.5 | 1.5 |
| Antioxidant 3 | — | — | — | — | — | — | — |
| Antioxidant 4 | — | — | — | — | — | — | — |
| Antioxidant 5 | — | — | — | — | — | — | — |
| Compound 1 | — | — | — | — | — | — | — |
| Compound 2 | — | — | — | — | — | 3 | — |
| Compound 3 | — | — | — | — | 3 | — | — |
| Compound 4 | — | — | — | 3 | — | — | — |
| Compound 5 | — | — | 3 | — | — | — | — |
| Compound 6 | — | 3 | — | — | — | — | — |
| Process oil | 3 | — | — | — | — | — | 3 |
| Resin | 5 | 5 | 5 | 5 | 5 | 5 | 5 |
| Zinc oxide | 2 | 2 | 2 | 2 | 2 | 2 | 2 |
| Stearic acid | 3 | 3 | 3 | 3 | 3 | 3 | 3 |
| Sulfur (containing 5% oil) | 1.5 | 1.5 | 1.5 | 1.5 | 1.5 | 1.5 | 1.5 |
| Vulcanization accelerator 1 | 2.5 | 2.5 | 2.5 | 2.5 | 2.5 | 2.5 | 2.5 |
| Vulcanization accelerator 2 | 2 | 2 | 2 | 2 | 2 | 2 | 2 |
| Results of evaluation | | | | | | | |
| Viscosity index | 100 | 114 | 105 | 108 | 114 | 114 | 113 |
| Fuel efficiency index | 100 | 102 | 92 | 96 | 100 | 94 | 107 |

TABLE 2-continued

| | Comparative Example | | | | | | |
|---|---|---|---|---|---|---|---|
| | 1 | 2 | 3 | 4 | 5 | 6 | 7 |
| Abrasion resistance index | 100 | 91 | 92 | 97 | 100 | 99 | 108 |

From the results shown in Tables 1 and 2, it is seen that since the rubber composition of the present disclosure is a rubber composition comprising the compound represented by the formula (1), the rubber composition of the present disclosure has low rubber viscosity during kneading and good processability though the rubber composition comprises 100 parts by mass or more of a white filler, and has good fuel efficiency and abrasion resistance.

The invention claimed is:

1. A rubber composition, comprising:
a rubber component;
a white filler; and
a compound of formula (1),

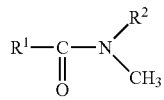
(1)

where $R^1$ represents an alkyl group or alkenyl group having 8 to 14 carbon atoms, the alkyl group or alkenyl group may be linear, branched or cyclic, and $R^2$ represents a hydroxyalkyl group or a hydroxyalkyl group having an oxyalkylene unit,
wherein a content of the compound of formula (1) is not less than 0.5 part by mass based on 100 parts by mass of the rubber component.

2. The rubber composition of claim 1, wherein the compound of the formula (1) is coconut oil fatty acid N-methylethanolamide.

3. The rubber composition of claim 1, wherein the white filler is silica.

4. The rubber composition of claim 1, further comprising:
an antioxidant of formula (3) or an antioxidant of formula (4),

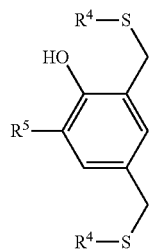
(3)

where each of $R^4$s independently represents a $C_1$ to $C_{20}$ alkyl group which may have a substituent, a phenyl group which may have a substituent or a benzyl group which may have a substituent, and $R^5$ is a $C_1$ to $C_{10}$ alkyl group which may have a substituent or a $C_5$ to $C_{12}$ cycloalkyl group which may have a substituent,

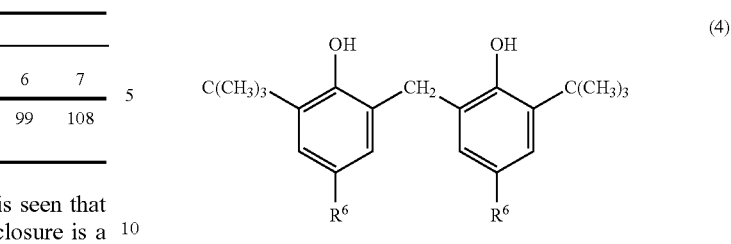
(4)

where each of $R^6$s independently represents a $C_1$ to $C_{10}$ alkyl group.

5. The rubber composition of claim 1, wherein the rubber composition comprises no antioxidant having dihydroquinoline.

6. The rubber composition of claim 2, wherein the white filler is silica.

7. The rubber composition of claim 2, further comprising:
an antioxidant of formula (3) or an antioxidant of formula (4),

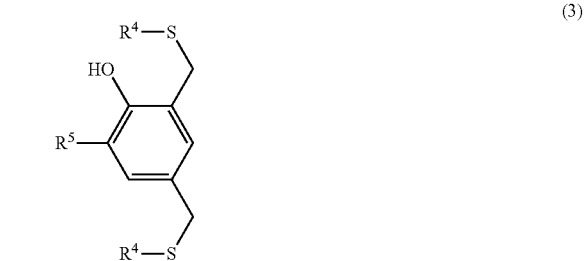
(3)

where each of $R^4$s independently represents a $C_1$ to $C_{20}$ alkyl group which may have a substituent, a phenyl group which may have a substituent or a benzyl group which may have a substituent, and $R^5$ is a $C_1$ to $C_{10}$ alkyl group which may have a substituent or a $C_5$ to $C_{12}$ cycloalkyl group which may have a substituent,

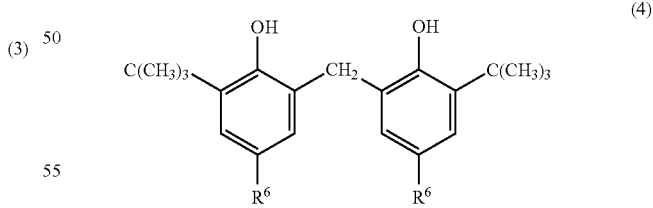
(4)

where each of $R^6$s independently represents a $C_1$ to $C_{10}$ alkyl group.

8. The rubber composition of claim 2, wherein the rubber composition comprises no antioxidant having dihydroquinoline.

9. The rubber composition of claim 3, further comprising:
an antioxidant of formula (3) or an antioxidant of formula (4),

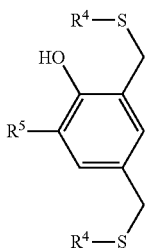

(3)

where each of $R^4$s independently represents a $C_1$ to $C_{20}$ alkyl group which may have a substituent, a phenyl group which may have a substituent or a benzyl group which may have a substituent, and $R^5$ is a $C_1$ to $C_{10}$ alkyl group which may have a substituent or a $C_5$ to $C_{12}$ cycloalkyl group which may have a substituent,

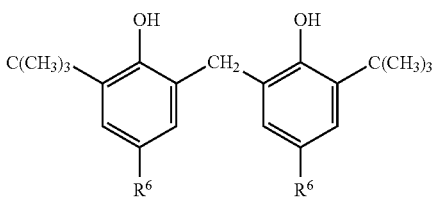

(4)

where each of $R^6$s independently represents a $C_1$ to $C_{10}$ alkyl group.

10. The rubber composition of claim 3, wherein the rubber composition comprises no antioxidant having dihydroquinoline.

11. The rubber composition of claim 4, wherein the rubber composition comprises no antioxidant having dihydroquinoline.

12. The rubber composition of claim 6, further comprising:
an antioxidant of formula (3) or an antioxidant of formula (4),

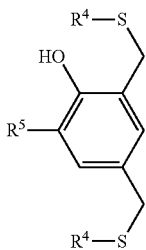

(3)

where each of $R^4$s independently represents a $C_1$ to $C_{20}$ alkyl group which may have a substituent, a phenyl group which may have a substituent or a benzyl group which may have a substituent, and $R^5$ is a $C_1$ to $C_{10}$ alkyl group which may have a substituent or a $C_5$ to $C_{12}$ cycloalkyl group which may have a substituent,

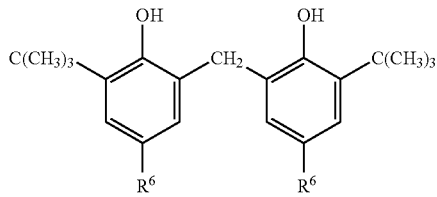

(4)

where each of $R^6$s independently represents a $C_1$ to $C_{10}$ alkyl group.

13. The rubber composition of claim 6, wherein the rubber composition comprises no antioxidant having dihydroquinoline.

14. The rubber composition of claim 7, wherein the rubber composition comprises no antioxidant having dihydroquinoline.

15. The rubber composition of claim 9, wherein the rubber composition comprises no antioxidant having dihydroquinoline.

16. The rubber composition of claim 12, wherein the rubber composition comprises no antioxidant having dihydroquinoline.

17. The rubber composition of claim 1, wherein the content of the compound of formula (1) is not less than 1.0 part by mass based on 100 parts by mass of the rubber component.

18. The rubber composition of claim 1, wherein the content of the compound of formula (1) is not more than 10 parts by mass based on 100 parts by mass of the rubber component.

19. The rubber composition of claim 17, wherein the content of the compound of formula (1) is not more than 10 parts by mass based on 100 parts by mass of the rubber component.

20. The rubber composition of claim 1, wherein the content of the compound of formula (1) is not more than 5 parts by mass based on 100 parts by mass of the rubber component.

* * * * *